United States Patent [19]

Steinberger

[11] 4,438,530

[45] Mar. 20, 1984

[54] ADAPTIVE CROSS-POLARIZATION INTERFERENCE CANCELLATION SYSTEM

[75] Inventor: Michael L. Steinberger, Colts Neck, N.J.

[73] Assignee: Bell Telephone Laboratories, Incorporated, Murray Hill, N.J.

[21] Appl. No.: 388,032

[22] Filed: Jun. 14, 1982

[51] Int. Cl.$^3$ .............................................. H04B 1/10
[52] U.S. Cl. ...................................... 455/278; 370/20; 343/361; 343/378; 455/283; 455/295; 455/303
[58] Field of Search ................. 333/18; 364/728, 819, 364/823; 370/19, 20, 37; 343/100 PE; 375/38, 102; 455/60, 276, 278, 283, 295, 303, 304

[56] References Cited

U.S. PATENT DOCUMENTS

| | | | |
|---|---|---|---|
| 4,146,893 | 3/1979 | Inagaki et al. | 343/100 PE |
| 4,233,576 | 11/1980 | Pelchat | 333/18 |
| 4,283,795 | 8/1981 | Steinberger | 455/283 |
| 4,310,813 | 1/1982 | Yuuki et al. | 333/117 |
| 4,320,535 | 3/1982 | Brady et al. | 455/278 |

OTHER PUBLICATIONS

W. Overstreet et al., "Crosstalk Cancellation . . . Satellite Links," Radio Science, vol. 14, No. 6, pp. 1041-1047 (1979).

D. Brandwood, "Cross-coupled Cancellation . . . Discrimination," Int. Conf. on Antennas and Propagation, 41-5, Part I (1978).

*Primary Examiner*—Benedict V. Safourek
*Attorney, Agent, or Firm*—Gregory C. Ranieri

[57] ABSTRACT

Separate components of a received signal are transmitted along two distinct paths to the adaptive cross-polarization interference cancellation arrangement. In each path, appropriate circuitry obtains a sample of a desired component in a particular signal, generates a signal representative of the power envelope of the sample, detects the in-phase and quadrature signals of a correlation between the desired component and interference, and generates control signals in response to the correlation signals to provide improved adjustment of the amplitude and phase of the interference in a canceler circuit. Each path includes a single square law device to reduce DC offset in correlation measurements which occur from square law device mismatches.

8 Claims, 7 Drawing Figures

ADAPTIVE CROSS-POLARIZATION INTERFERENCE CANCELLATION SYSTEM

TECHNICAL FIELD

This invention relates to terrestrial and satellite telecommunication systems and, more particularly, to adaptive cross-polarization interference cancellation.

BACKGROUND OF THE INVENTION

Channel capacity of telecommunication systems is doubled by transmitting independent signals within the same frequency band in orthogonal polarizations. Isolation between signals of these orthogonal polarizations is diminished by atmospheric and other effects such as rain depolarization, Faraday rotation in the ionosphere, and imperfect antenna alignment. Reduction of the isolation between orthogonally polarized signals increases cross-coupling between the polarized signals. Cross-coupling is a source of interference which seriously degrades service quality of a telecommunication system.

Cross-polarization interference cancellation has been proposed as a suitable means of reducing interference caused by coupling between a cross-polarized signal and the signal of interest. See, for example, the cross-polarization interference cancelers suggested in the articles of Y. Bar-Ness et al., "Cross Coupled Boatstrapped Interference Canceler," Int. Conf. on Antennas and Propagation, Vol. I, pp. 292-5 (1981) and D. Brandwood, "Cross-Coupled Cancellation System for Improving Cross-Polarisation Discrimination," Int. Conf. on Antennas and Propagation, Part I, pp. 41-5 (1978).

Many cross-polarization interference cancelers include correlators or power detectors to provide cancellation performance measure signals which are used to control the operation of the canceler circuit (see FIG. 1). In order to generate the performance measure signals, these circuits generally include a plurality of square law devices. Mismatching between square law devices leads to errors such as DC offset in the performance measure signals which, in turn, limit the accuracy and overall performance of the interference canceler.

SUMMARY OF THE INVENTION

Accurate cross-polarization interference cancellation is achieved by eliminating DC offset in the performance measure (correlation) signals, in accordance with the invention, wherein a single square law device is time-shared by a plurality of sequential intermediate signal measurements to develop in-phase and quadrature components of the correlation signals as performance measure signals. Correlation is measured between desired components of the co-polarized signal and interfering components of the cross-polarized signal.

In one embodiment of the invention, correlation is carried out by a switched power detector. The switched power detector includes, in series circuit relationship, a quadrature RF switch, a signal combiner, a square law device, and a quadrature detector or baseband correlator. The co-polarized signal is supplied to the RF switch whose position is controlled by several clock signals. Substantially pure interference is supplied to the signal combiner wherein a sample of the cross-polarized signal is added to the output of the RF switch. The square law device measures the power in the signal output from the combiner. In-phase and quadrature correlation is performed in the baseband correlator upon the output signal of the square law device.

BRIEF DESCRIPTION OF THE DRAWINGS

A more complete understanding of the invention may be obtained by reading the following description of specific illustrative embodiments of the invention in conjunction with the appended drawings in which.

DETAILED DESCRIPTION

Figure 1:
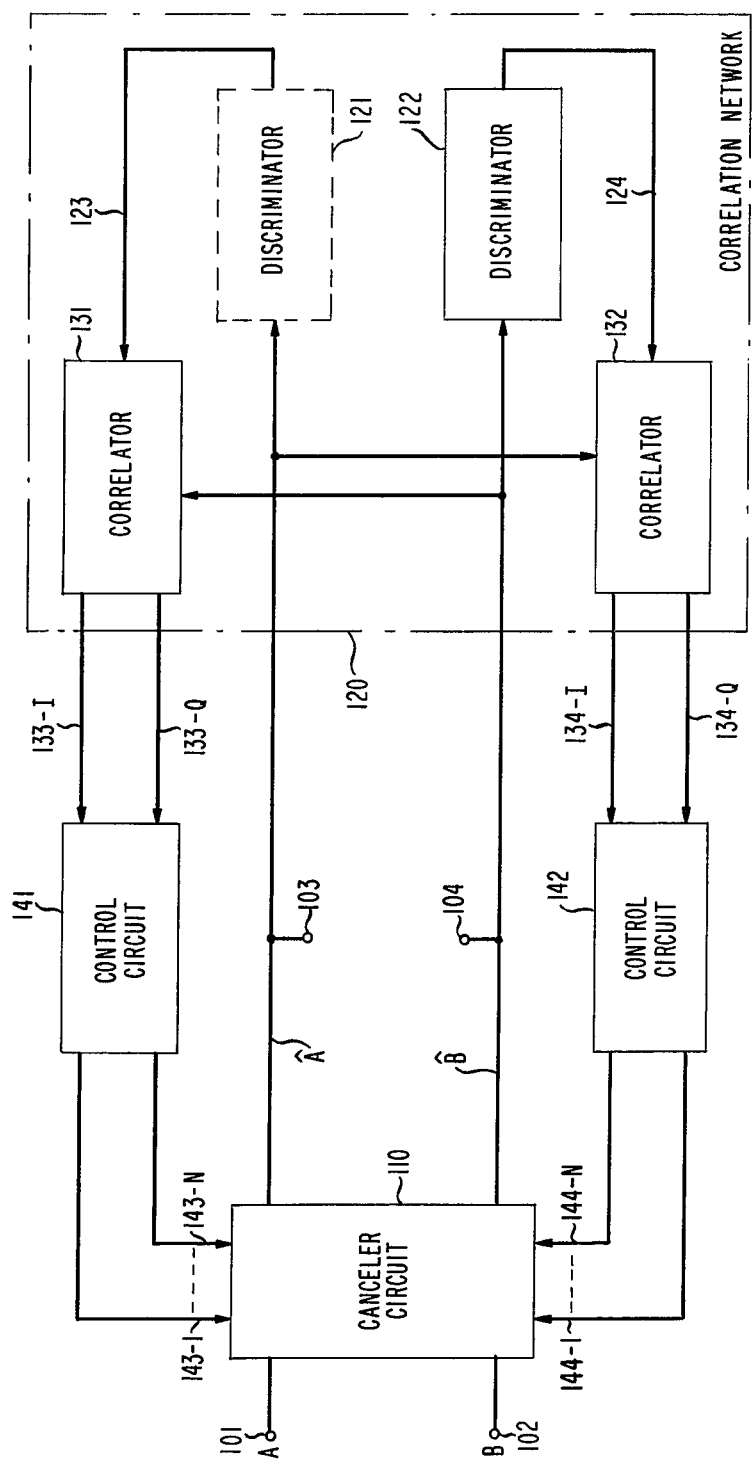
FIG. 1 is a diagram of a cross-polarization interference cancellation arrangement.

FIG. 1 is a block diagram of an adaptive cross-polarization interference cancellation arrangement for use in cancellation of cross-polarization interference between a desired polarization signal and interfering cross-polarization components from a second orthogonally polarized signal received in overlapping frequency channels.

The description which follows is directed to the use of the present arrangements in a small earth station receiving terminal associated with a satellite communication system for suppressing cross-polarization components of an interfering linearly polarized signal concurrently received from the same or a different direction with an orthogonally polarized desired signal from the satellite. It is to be understood that such description is exemplary only and is for purposes of exposition and not for purposes of limitation. It can readily be appreciated that the present arrangements can also be used with terrestrial microwave systems for effecting cross-polarization interference cancellation.

The first and second orthogonally polarized signals are received by an appropriate antenna arrangement (not shown) known in the art. Both signals are applied to the input of a dual polarization coupler (not shown) which is capable of separating orthogonally polarized components in a received signal and transmitting such separated components over separate paths. More particularly, the dual polarization coupler functions to (1) transmit a desired signal, s(t), of a first polarization and cross-polarization component, bn(t), of a second orthogonally polarized interfering signal over a first circuit path starting at terminal 101, and (2) transmit a desired signal, n(t), of a second polarization and cross-polarization component, cs(t), of the first orthogonally polarized interfering signal over a second circuit path starting at terminal 102. Coefficients b and c are complex interference coupling coefficients having typical respective magnitudes much less than unity. Therefore, signal A or A(t) at terminal 101 can be represented by the expression s(t)+bn(t), while signal B or B(t) at terminal 102 can be represented by the expression $n(t)+cs(t)$. The dual polarization coupler can comprise any suitable circuit known in the art.

Interference cancellation arrangements respond to various control signals to reduce interference from the input signals A and B and, thereby, generate output signals $\hat{A}$ and $\hat{B}$ at terminals 103 and 104, respectively. Signals $\hat{A}$ and $\hat{B}$ are represented by the approximations, $\hat{A}(t) \approx s(t)$ and $\hat{B}(t) \approx n(t)$.

In FIG. 1, the cross-polarization interference cancellation arrangement is comprised of two circuit paths: one path reduces interference from signal A, while the second path reduces interference from signal B. The first path comprises input terminal 101, canceler circuit 110, output terminal 103, correlation network 120 including discriminator 121 (optional) and correlator 131, and control circuit 141. Similarly, the second circuit path comprises input terminal 102, canceler circuit 110, output terminal 104, correlation network 120 including discriminator 122 and correlator 132, and control circuit 142. It should be understood that elements shown by dashed lines in FIG. 1 (element 121) and the subsequent Figures are intended to be optional to the realization of the particular arrangement.

Canceler circuit 110 is controlled by signals 143-1 through 143-N and signals 144-1 through 144-N to reduce the level of interference present in each input signal. In general, canceler circuit 110 samples corrupted input signal B, controllably modifies the amplitude and phase of the sample of signal B in response to signals 144-1 through 144-N, and combines the modified sample with input signal A to generate output signal $\hat{A}$. Similarly, canceler circuit 110 samples corrupted input signal A, controllably modifies the amplitude and phase of the sample of signal A in response to control signals 143-1 through 143-N, and combines the resulting modified sample with input signal B to generate output signal $\hat{B}$.

A typical example of a canceler circuit is described by D. H. Brandwood in an article entitled "Cross-Coupled Cancellation System for Improving Cross-Polarisation Discrimination," International Conf. on Antennas and Propagation, Part I, pp. 41-5 (1978). A similar circuit has been incorporated in an Adaptive Interference Reduction Network System for Satellite Ground Stations which has been offered for sale by Marconi Space and Defense Systems Limited, Great Britain. Another example of a canceler circuit is described by W. P. Overstreet and C. W. Bostian in Vol. 14 of Radio Science, pp. 1041-1047.

Output signal $\hat{A}$ is supplied to the input of correlation network 120 and, in particular, to discriminator 121. Discriminator 121 operates on its input signal, signal $\hat{A}$, to enhance the desired signal component due to s(t) relative to any interference component due to n(t). In general, signal $\hat{A}$ at the input of discriminator 121 has a desired signal component s(t) which is significantly larger than the interfering signal component due to n(t).

Brandwood, in his above-cited article, reports the use of a limiter to perform discriminator. Assuming that component signals s(t) and n(t) exhibit suitably small peak-to-average amplitude ratios, it is clear that a limiter performing the discrimination function will operate in a small signal suppression mode by suppressing interfering signal components due to n(t) in favor of desired signal components due to s(t).

An alternative technique for implementing discriminator 121 is described in U.S. Pat. No. 4,283,795 issued to M. L. Steinberger on Aug. 11, 1981. This technique requires that signals n(t) and s(t) have frequency spectra which are offset relative to each other. Discrimination is then performed by a filter whose response characteristic causes rejection of the frequencies characteristic of interfering signal n(t) and passes the frequencies apparent in desired signal s(t).

Output signal 123 from discriminator 121 is supplied to the input of correlator 131 along with signal $\hat{B}$. Correlator 131 measures the in-phase and quadrature components of the correlation between signal $\hat{B}$ and signal 123. The in-phase correlation measurement is output as signal 133-I and the quadrature correlation measurement is output as signal 133-Q. It is known in the art that this function can be performed by a suitable arrangement of mixers, in-phase couplers and quadrature couplers. Correlator 131 can also be realized by a combination of a Series 10750 phase discriminator and differential amplifiers as described in the Anaren Microwave Inc. catalogue M9001-67 at pp. 243-244.

Signals 133-I and 133-Q from correlator 131 are supplied to control circuit 141 wherein the signals are used to generate control signal 143-1 through 143-N and N is a finite integer greater than unity. As stated above, control signals 143-1 through 143-N are used by canceler circuit 110 to control the portion of interference cancellation concerned with extracting the interference caused by input signal A in input signal B. Control circuit 141 adjusts the magnitudes and phases of control signals 143-1 through 143-N in order to minimize the amplitudes of the in-phase (133-I) and quadrature (133-Q) correlation component signals. Implementation of control circuit 141 is described in detail below with reference to FIGS. 5, 6 and 7.

As stated above, the second circuit path includes discriminator 122, correlator 132 and control circuit 142. Output signal $\hat{B}$ is supplied to discriminator 122 wherein the signal component of signal $\hat{B}$ due to signal n(t) is enhanced with respect to the component of signal $\hat{B}$ due to interfering signal s(t). Discriminator 122 generates signal 124. Correlator 132 measures the correlation between signal 124 and signal $\hat{A}$ and, thereby, generates in-phase (signal 134-I) and quadrature (signal 134-Q) signal components of the measured correlation. In-phase signal 134-I and quadrature signal 134-Q are supplied to control circuit 142 for generating control signals 144-I through 144-N. The control signals are used by canceler circuit 110 to control the portion of interference cancellation which is concerned with extracting the interference caused by input signal B in input signal A.

Discriminator 122, correlator 132 and control circuit 142 are each realized in a manner identical to discriminator 121, correlator 131 and control circuit 141, respectively. Discriminator 121 is shown in FIG. 1 as being optional. It is important to note that the use of at least one discriminator is necessary for proper operation of the interference cancellation arrangement.

To recapitulate, the cross-polarization interference cancellation arrangement of FIG. 1 operates as follows. Discriminator 121 and correlator 131 cooperate to generate correlation component signals which are more representative of desired signal s(t) rather than interfering signal n(t). In the first circuit path (elements 121, 131, 141 and 110), there is an effort to isolate signal s(t) and reduce the residual amount of signal s(t) in output signal $\hat{B}$ in the second circuit path. As the presence of signal s(t) in output signal $\hat{B}$ is reduced by the action of control signals along the first path, discriminator 122 and correlator 132 cooperate to generate correlation component signals which are more representative of signal n(t) rather than signal s(t). Hence, the second circuit path elements (elements 122, 132, 142 and 110) combine to isolate signal n(t) and reduce the residual amount of signal n(t) in output signal Â in the first circuit path. Both circuit paths continue through the above described cycles until output signals Â and B̂ are approximately equal to signals s(t) and n(t), respectively.

An important limitation on the performance of the arrangement shown in FIG. 1 is that DC offset error signals are present in the correlator output signals. That is, when correlator 131 and 132 are implemented with a plurality of square law devices according to prevailing techniques as described above, the in-phase and quadrature component signals, signals 133-I, 133-Q, 134-I and 134-Q, include not only the desired product terms but also undesired self-product terms. The undesired product terms arise from mismatching of square law devices and from insertion loss errors in associated coupler networks. Errors in the correlation component signals propagate through control circuits 141 and 142 to bias the respective control signals by an amount proportional to the DC offset present in the correlation component signals at the correlator outputs.

Figure 2:
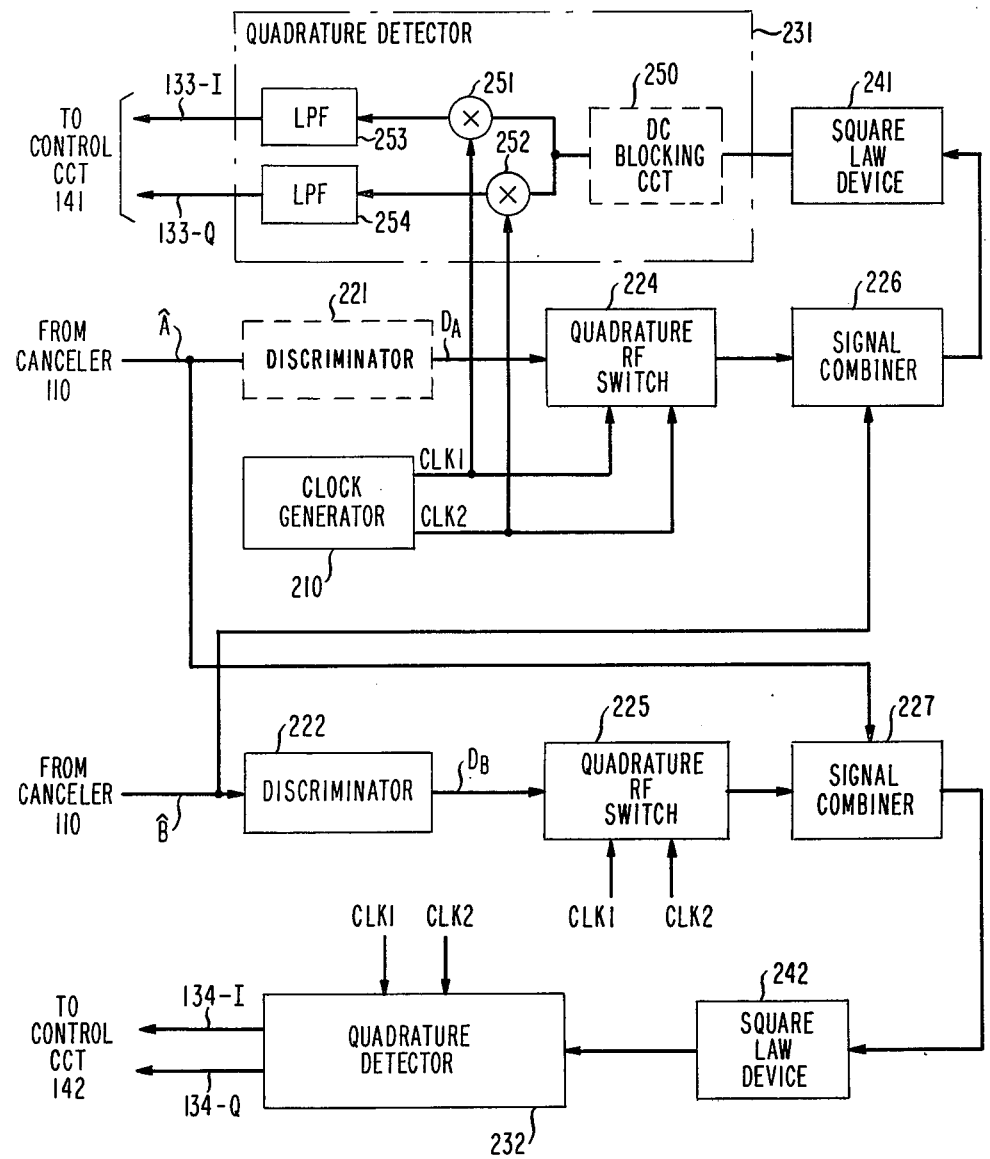
FIGS. 2 and 3 are block diagrams of alternative correlation networks constructed in accordance with the present invention and useful in the cancellation arrangement in FIG. 1.

The above described limitations are substantially eliminated, in accordance with the present invention, by replacing correlation network 120 by the arrangement shown in FIG. 2 and described below. As shown in FIG. 2, the first path through correlation network 120 of FIG. 1 is replaced by the combination of discriminator 221, clock generator 210, quadrature RF switch 224, signal combiner 226, square law device 241 and quadrature detector 231. The second path through correlation network 120 is replaced by discriminator 222, quadrature RF switch 225, signal combiner 227, square law device 242 and quadrature detector 232.

Clock generator 210 generates two output signals, namely signals CLK1 and CLK2. Signals CLK1 and CLK2 are switching waveforms which are orthogonal to each other in a signal space sense. For example, signal CLK1 is a square wave with frequency f, and signal CLK2 is a square wave of the same frequency but delayed with respect to clock 1 by one quarter of a cycle. Clock signals CLK1 and CLK2 are supplied to the in-phase and quadrature controls of quadrature RF switch 224.

Discriminator 221 is optional to the embodiment shown in FIG. 2 and performs the idential function to discriminator 121 as described above.

Quadrature RF switch 224 controllably shifts the phase of an input signal supplied from discriminator 221 by one of four different, equally spaced phases over the inverval 0 degrees to 360 degrees under the control of signals CLK1 and CLK2. For example, quadrature RF switch 224 is configured to adjust periodically the relative phase of the input signal by 45 degrees, 135 degrees, 225 degrees, or 315 degrees in accordance with the combined states of signals CLK1 and CLK2. The phase adjusted output signals from switch 224 form a time multiplexed signal which allowed time sharing of a single square law device for performing correlation. For optimum performance, the DC level of signals CLK1 and CLK2 at the control inputs to quadrature RF switch 224 are adjusted to minimize the variation of inseration loss between the different phase settings. Quadrature RF switch 224 is capable of being implemented by a quadraphase modulator such as one manufactured by Anaren Microwave Inc. with model number 260017.

Quadrature RF switch 224 generates the multiplexed signal which is combined with system output signal B̂ in signal combiner 226. Signal combiner 226 forms the sum of both input signals. The sum output signal generated by signal combiner 226 is supplied to square law device 241. Combiner 226 is implemented by using a directional coupler, quadrature hybrid coupler, or in-phase combiner.

Square law device 241 generates an output signal whose amplitude varies as an approximate square of its input amplitude. Square law device 241 detects the power in the output signal of combiner 226 and generates an output signal which represents the power envelope of the combiner output signal. The output of square law device 241 is affected by phase changes caused by quadrature RF switch 224 directly related to the combined states of signals CLK1 and CLK2. See, for example, the table below which illustrates the functional relationship between signals CLK1 and CLK2, and the output signal of square law device 241.

| CLOCK SIGNALS | | OUTPUT SIGNAL |
| --- | --- | --- |
| CLK1 | CLK2 | DEVICE 241 |
| +1 | +1 | $\overline{|\hat{B} + (1 + j)D_A|^2}$ |
| +1 | −1 | $\overline{|\hat{B} + (1 - j)D_A|^2}$ |
| −1 | −1 | $\overline{|\hat{B} - (1 + j)D_A|^2}$ |
| −1 | +1 | $\overline{|\hat{B} - (1 - j)D_A|^2}$ |

In the table above $D_A$ is the output signal from discriminator 221 and j is $\sqrt{-1}$.

The tabular expressions for the output signal from square law device 241 are expandable into a more usable form by simple methods. For example, $$\overline{|\hat{B} + (1+j)D_A|^2} = (\hat{B} + (1+j)D_A)(\hat{B}^* + (1-j)D^*_A) =$$

$$|\hat{B}|^2 + 2|D_A|^2 + 2Re(\hat{B}^*D_A) + 2Re(j\hat{B}^*D_A),$$

where * indicates complex conjugation. Similar expansion can be performed upon the remaining output signals in the table above.

The output signal of square law device 241 is supplied to quadrature detector 231 wherein the correlation between signals $D_A$ and $\hat{B}$ is measured in baseband. Quadrature detector 231 includes DC blocking circuit 250, mixers 251 and 252, and low pass filters 253 and 254. DC blocking circuit 250 in correlator 231 is an optional element which, if employed, is capable of eliminating constant terms in the output signal from device 241. Circuit 250 reduces the level of variations which are subsequently averaged by low pass filters 253 and 254. The output of DC blocking circuit 250 is supplied to baseband mixers 251 and 252 along with clock signals CLK1 and CLK2.

In mixer 251, the output signal of circuit 250 is multiplied by clock signal CLK1. In effect, the multiplication supplies the appropriate sign to the output signal from square law device 241. The resultant signal from this multiplication is averaged by low pass filter 253 to generate in-phase correlation component signal 133-I. The rejection band of low pass filter 253 extends below the frequency of signals CLK1 and CLK2, so that the low pass filter averages over all four possible output signals from square law device 241. After accounting for the changes in sign introduced by mixer 251, the output of low pass filter 253 is given as follows:

$$\overline{|\hat{B} + (1+j)D_A|^2} + \overline{|\hat{B} + (1-j)D_A|^2} -$$

$$\overline{|\hat{B} - (1+j)D_A|^2} - \overline{|\hat{B} - (1-j)D_A|^2} = (|\hat{B}|^2 +$$

$$2|D_A|^2 + 2Re(\hat{B}^*D_A) + 2Re(j\hat{B}^*D_A)) + (|\hat{B}|^2 + 2|D_A|^2 +$$

$$2Re(\hat{B}^*D_A) - 2Re(j\hat{B}^*D_A)) - (|\hat{B}|^2 + 2|D_A|^2 - 2Re(\hat{B}^*D_A) -$$

$$2Re(j\hat{B}^*D_A)) - (|\hat{B}|^2 + |D_A|^2 - 2Re(\hat{B}^*D_A) + 2Re(j\hat{B}^*D_A)) =$$

$$8Re(\hat{B}^*D_A).$$

which is the real part of the correlation between signals $\hat{B}$ and $D_A$. In a similar manner, mixer 252 and filter 254 combine to respond to the output signal of circuit 250 and signal CLK2 to form quadrature correlation component signal 133-Q.

In combination, clock generator 210, quadrature RF switch 224, signal combiner 226, square law device 241 and baseband correlator 231 cooperate to eliminate substantially the DC offset in correlator output signals 133-I and 133-Q as well as in control signal 143-1 through 143-N. As opposed to prior implementations, the present arrangement includes only one square law device per circuit path realized by a crystal detector or diode or the like. Because the same square law device is used to evaluate all four component signals in the equation above, measurements are carried out with the same gain, and the output signal from low pass filter 253 will not contain any error signals related to $|\hat{B}|^2$ or $|D_A|^2$. Hence, the present arrangement avoids the problem of matched pairs of square law devices by judicious use of clock signals CLK1 and CLK2 and quadrature RF switch 224. Sequential intermediate measurements taken by RF switch 224 cause square law device 241 to be time-shared in providing signals to correlator 231 thereby eliminating a need for a plurality of matched square law devices.

Clock generator 210, discriminator 222, quadrature RF switch 225, signal combiner 227, square law device 242 and baseband correlator 232 operate in a manner similar to their respective counterparts in the first circuit path described above, except that the combination of elements in the second circuit path is used to evaluate the correlation between output signal $\hat{A}$ and signal $D_B$ from discriminator 222.

Figure 3:
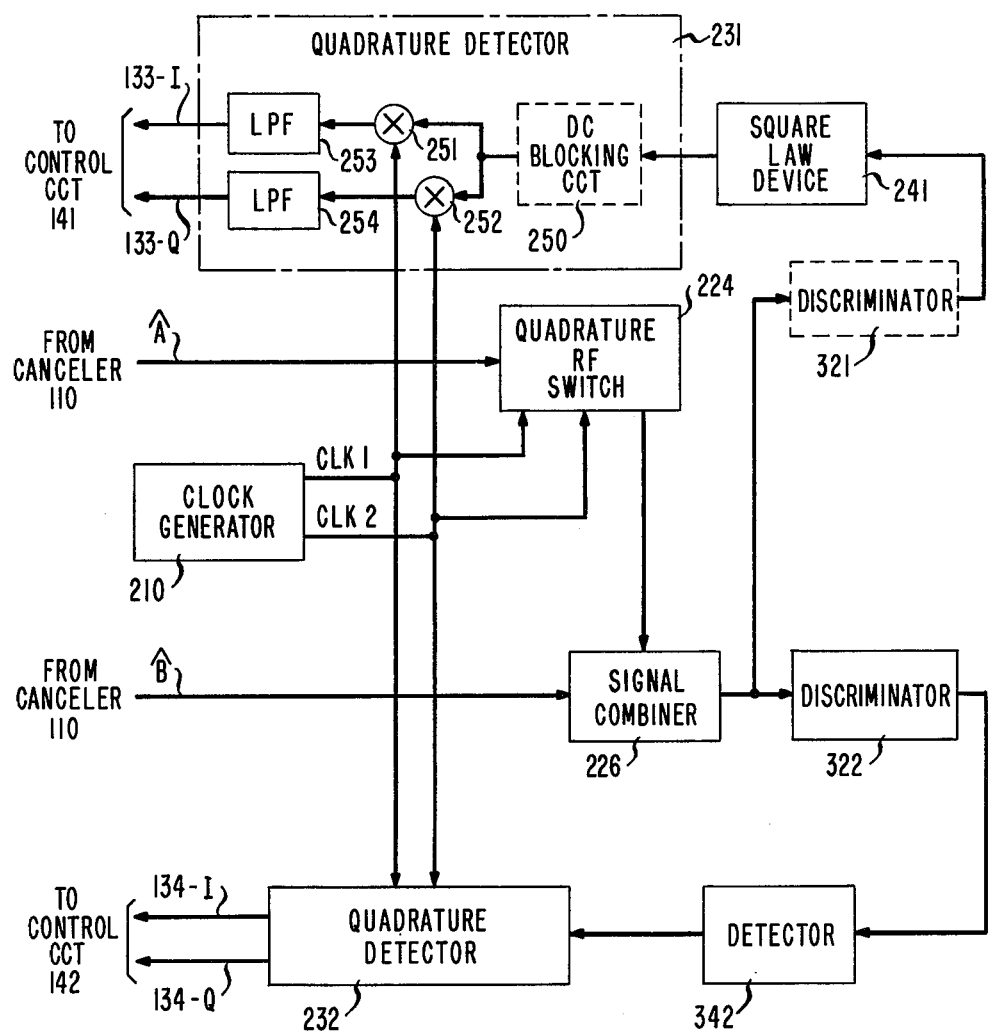

A reduction of hardware complexity is effected by replacing the arrangement shown in FIG. 2 by the arrangement shown in FIG. 3. In FIG. 3, the arrangement includes only one quadrature RF switch (224) and one signal combiner (226). Additionally, discriminators have been inserted in each circuit path between the signal combiner output and the inputs of the associated square law devices. In this arrangement, the basic principles of operation are identical to those described for the arrangement shown in FIG. 2.

Discriminators 321 and 322 are capable of being realized as filters, based upon the technique disclosed in the aforementioned U.S. Pat. No. 4,283,795. With this type of discriminator, detector 342 is realizable as a square law device.

In the alternative, discriminators 321 and 322 are capable of being realized as limiters. This realization requires modification to other circuit elements. In particular, signal combiner 226 is arranged such that power in the combiner output signal due to signal $\hat{B}$ is greater than power in the same signal due to $\hat{A}$ under substantially all conditions. With this modification in combiner 226, discriminator 321 can be omitted and discriminator 322 is realized as an amplifier having sufficient gain to increase the power of the signal supplied to detector 342. As such, detector 342 operates as an envelope detector. In this way, the signal component at the input to detector 342 due to signal s(t) is less than the signal component due to signal n(t). If signal s(t) has a small peak-to-average amplitude ratio, then the signal component due to signal s(t) at the input to detector 342 has a negligible effect on the average envelope measured by detector 342. On the other hand, any component of signal n(t) which is present in signal $\hat{A}$ has a measurable effect on the envelope measure by detector 342 because the component of signal n(t) in signal $\hat{A}$ is coherent with signal n(t).

Figure 4:
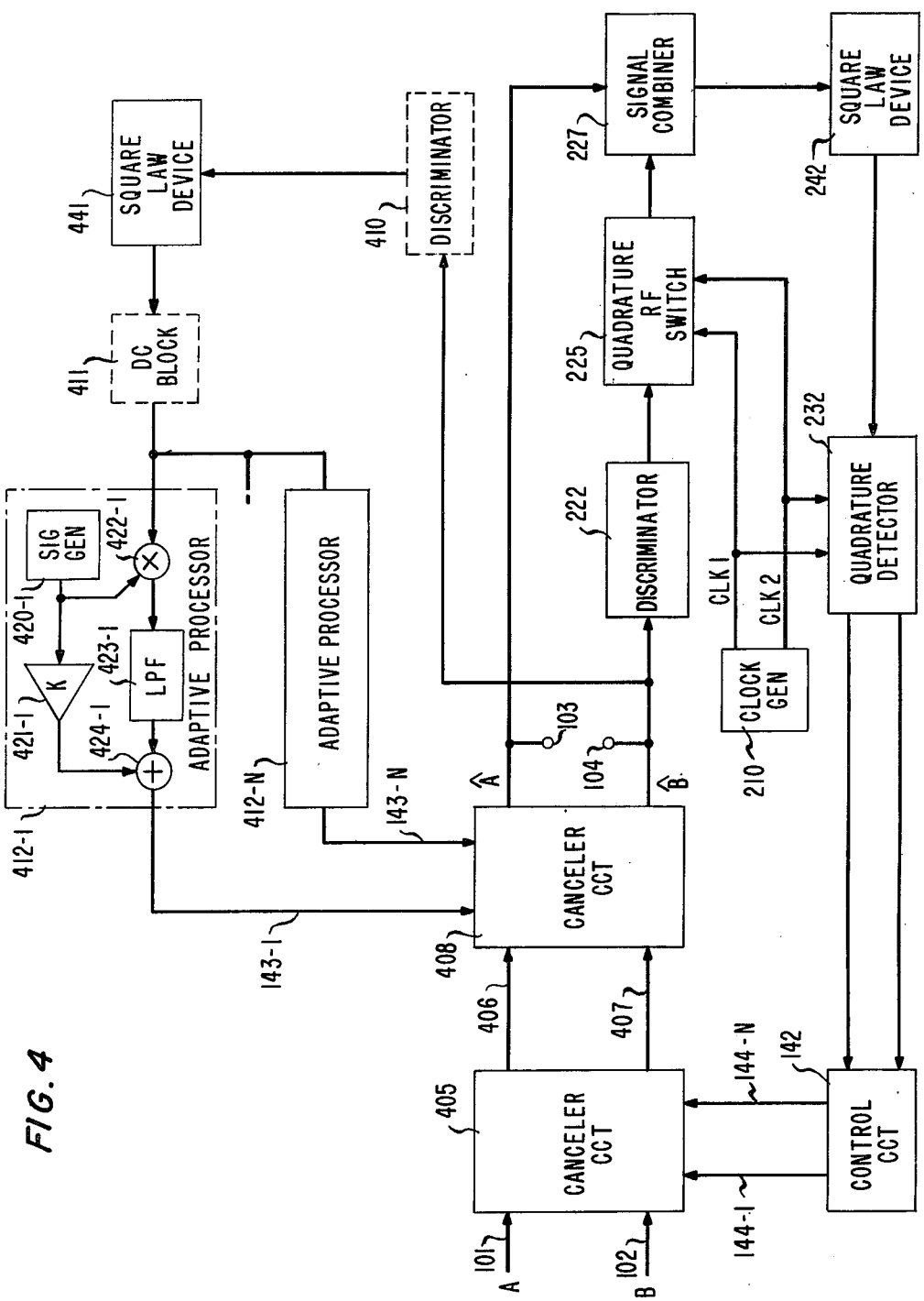
FIG. 4 is a diagram of an adaptive cross-polarization interference cancellation arrangement.

Another reduction of hardware complexity is realized for an entire cross-polarization interference cancellation arrangement as shown in FIG. 4. In comparison with the arrangement shown in FIG. 1, it is seen that, in the arrangement of FIG. 4, tandem canceler circuits 405 and 408 replace original canceler circuit 110. Additionally, correlation is carried out along the second circuit path by the combination of clock generator 210, discriminator 222, quadrature RF switch 225, signal combiner 227, square law device 242, and quadrature detector 232 exactly as in FIG. 2. However, in the first circuit path, the combination of the discriminator 410, detector 441, DC block 411, and the adaptive processors 412-1 through 412-N carries out the functions originally performed by discriminator 121, correlation 131, and control circuit 141 of FIG. 1. Each new element in the first circuit path of FIG. 4 is described below in more detail.

Canceler circuit 405 couples a sample from input signal B, modifies the amplitude and phase of that sample under the control of control signals 144-1 through 144-N, and couples the resulting signal into input signal A. It is easily understood that the function of control circuit 142 is to adaptively adjust control signals 144-1 through 144-N so that, in response to the control signals, canceler circuit 405 removes the interfering signal components of input signal B from input signal A. Canceler circuit 405 also passes input signal B substantially unchanged as output signal 407.

Canceler circuit 408 performs analogously to canceler circuit 405 by coupling output signal 406 into signal 407 to yield system output signal $\hat{B}$ at terminal 104. Canceler circuit 108 also passes output signal 406 of canceler circuit 405 substantially unchanged as system output signal $\hat{A}$ at terminal 103. It should be noted that canceler circuit 408 is controlled by signals 143-1 through 143-N generated in the first circuit path.

In the first circuit path discriminator 410 (optional) enhances the signal components in signal $\hat{B}$ due to signal s(t) while suppressing the components due to signal n(t). Discriminator 410 can be implemented as a filter which passes the frequencies at which signal s(t) is strongest while rejecting the frequencies at which signal n(t) is strongest. The output of the discriminator 410 is detected by the square law device 441.

Square law device 441 generates an output signal which is a measure of the power in discriminated signal $\hat{B}$ in which the power due to signal s(t) has been enhanced by discriminator 410 relative to the power due to signal n(t). The detected power from device 441 is then minimized with respect to control signal 143-1 through 143-N by the corresponding adaptive processors 412-1 through 412-N. The combined use of square law device 441 with adaptive processors 412-1 through 412-N for generating control signals 143-1 through 143-N follows from a known system as described by D. Brady et al. in U.S. Pat. No. 4,320,535 issued Mar. 16, 1982.

Adaptive processor 412-1 is a combination of signal generator 420-1, amplifier 421-1, mixer 422-1, low pass filter 423-1, and summing junction 424-1. Adaptive processor 412-1 minimizes thhe output of square law device 441 with respect to control signal 143-1.

Signal generator 420-1 generates a periodic signal which is multiplied in amplifier 421-1 by a constant k, $k \ll 1$. Summing junction 424-1 adds the amplifier output signal into control signal 143-1 at the processor output. The effect of the signal generated by signal generator 420-1 on the output of square law device 441 is then coherently detected in mixer 422-1. Mixer 422-1 measures the derivative of the output of square law device 441 with respect to control signal 143-1. The output of mixer 422-1 is supplied to low pass filter 423-1, which operates as an integrator. High DC gain for low pass filter 423-1 closes a control loop of the first circuit path driving the output of mixer 422-1 to zero. Thus, the magnitude of the signal at the input to square law device 441 is minimized with respect to control signal 143-1.

Signal generators 420-1 through 420-N generate periodic signals which are mutually orthogonal in a signal space sense. For example, each signal generator 420-1 through 420-N generates a square wave having a frequency which is unique to that signal generator. With signal generators 420-1 through 120-N configured in this manner, each adaptive processor is independent of the other adaptive processors. That is, each adaptive processor minimizes the magnitude of the input signal at square law device 441 with respect to the respective control signal at its output terminals.

DC block circuit 411 (optional) can be inserted between square law device 441 and adaptive processors 412-1 through 412-N to remove DC components, in the output of square law device 441. This DC blocking circuit reduces the AC component to be filtered by low pass filter 423-1 and the corresponding low pass filter in adaptive processors 412-2 through 412-N.

From a system standpoint, the operation of the arrangement shown in FIG. 4 is substantially identical to the operation of the arrangement shown in FIG. 1. By virtue of the discrimination introduced by discriminator 410, the first circuit path including elements 408, 410, 441, 411, 412-1, ..., 412-N reduces the interfering signal components in signal $\hat{B}$ due to signal s(t). This, in turn, along with the discrimination introduced by discriminator 222, causes the second circuit path including elements 405, 222, 210, 225, 227, 242, 232, 142 to reduce the interfering signal components in canceler circuit output signal 406 ($\hat{A}$) due to the signal n(t). Thus, canceler circuit output signal 406 more closely approximates signal s(t). In turn, the first circuit path further reduces the interfering signal component in output signal $\hat{B}$ due to signal s(t). This process is repeated until system output signal $\hat{A}$ is essentially an uncorrupted version of signal s(t), and system output signal $\hat{B}$ is essentially an uncorrupted version of signal n(t). Thus, the system shown in FIG. 4 is substantially isomorphic to the arrangements shown in FIGS. 1 and 2 while operating with less microwave hardware.

Figure 5:
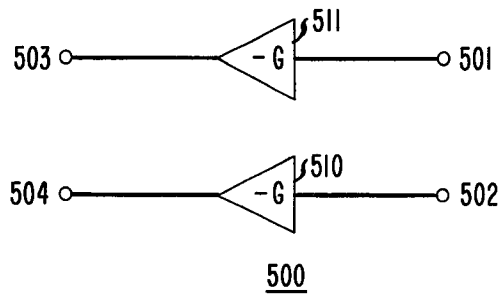
FIG. 5 is a schematic diagram of a control circuit useful in the cancellation arrangement in FIGS. 1 and 4.

FIG. 5 depicts one implentation for control circuits 141 and 142. Controller 500 consists of DC amplifiers 510 and 511, each of which provides gain -G. With controller 500 substituted for circuit 141, input terminal 501 accepts the in-phase component of the measured correlation signal 133-I, and input terminal 502 accepts the quadrature component of the measured correlation signal 133-Q. At output terminal 503 of DC amplifier 511 is control signal 143-1 which is used to drive in-phase cancellation by canceler circuit 110. Similarly, at output terminal 504 of amplifier 510 is control signal 143-2 which is used to drive quadrature cancellation along the same cancellation path. If correlator 131 performs the correlation measurement with the same relative phase that canceler circuit 110 performs the corresponding cancellation, then control circuit 500 is capable of providing sufficient loop gain in the first circuit path to cause the in-phase (133-I) and quadrature (133-Q) components of correlation to approach zero. In an analogous manner, controller 500 can also be used to implement control circuit 142.

Controller 500 has two limitations. First, this control technique is only capable of controlling two degrees of freedom in canceler circuit 110. Second, controller 500 requires that correlator 131 be phase matched to canceler circuit 110. This requirement is difficult to accomplish for an interference cancellation system operating at microwave frequencies because it necessitates extremely careful control of signal path lengths.

Figure 6:
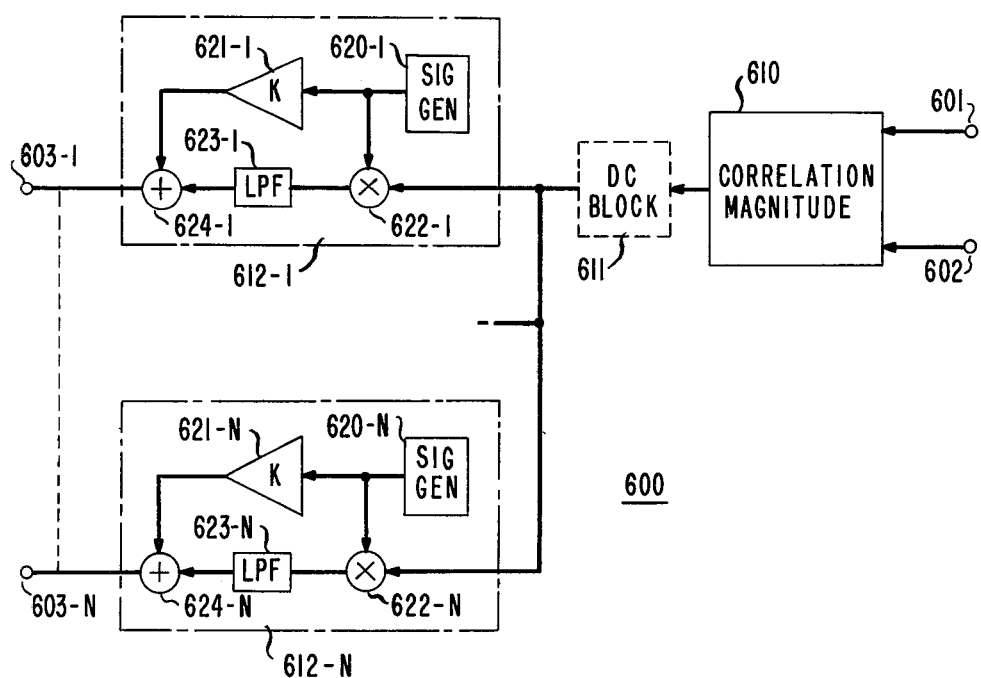
FIG. 6 is a schematic diagram of an alternative control circuit useful in implementing the cancellation arrangement in FIGS. 1 and 4.

Both of these limitations are avoided by employing controller (600) shown in FIG. 6, which has been disclosed in U.S. Pat. No. 4,283,795. Controller 600 shown in FIG. 6 is employed to minimize the correlation magnitude as given by correlation component signal pairs 133-I, 133-Q or 134-I, 134-Q. Controller 600 includes correlation magnitude circuit 610, DC blocking circuit 611, adaptive processors 612-1 through 612-N, input terminals 601 and 602, and output terminals 603-1 through 603-N.

When controller 600 is used to implement the control circuit 141 of FIG. 1, input terminal 601 accepts in-phase component signal 133-I of the measured correlation while input terminal 602 is supplied with quadrature component signal 133-Q.

Correlation magnitude circuit 160 forms the sum of the absolute values of the signals at inputs 601 and 602. The output from correlation magnitude circuit 610 is an approximation of the magnitude of the correlation. That is, the output of correlation magnitude circuit 610 approaches zero when the magnitude of the correlation is zero. An implementation for correlation magnitude circuit 610 will be described in reference to FIG. 8.

The output from correlation magnitude circuit 610 is minimized by adaptive processors 612-1 through 612-N. Each adaptive processor generates a control signal by minimizing the output of correlation magnitude circuit 610 with respect to control signal 143-i at terminal 603-i, where is is in the range 1 through N. Output terminals 603-1 through 603-N supply control signal 143-1 through 143-N to canceler circuit 110.

Each adaptive processor 612-i includes signal generator 620-i, amplifier 621-i, mixer 622-i, low pass filter 623-i, and summing junction 624-i. In adaptive processor 612-1, for example, signal generator 620-1 generates a periodic signal which is multiplied in amplifier 621-1 by a constant k, $k<<1$. Summing junction 624-1 adds the amplifier output signal into control signal 143-1 at terminal 603-1. The effect of the signal generated by signal generator 620-1 on the output of correlation magnitude circuit 610 is then coherently detected in mixer 622-1. The output of mixer 622-1 is a measure of the derivative of the output of correlation magnitude circuit 610 with respect to control signal 143-1 at terminal 603-1. The output of mixer 622-1 is input into low pass filter 623-1, which operates as an integrator. High DC gain of low pass filter 623-1 closes the control loop of the first circuit path driving the output of mixer 622-1 to zero. Thus, the magnitude of the correlation at input terminals 601 and 602 to controller 600 is minimzed with respect to control signal 143-1.

Signal generators 620-1 through 620-N generate periodic signals which are mutually orthogonal in a signal space sense. for example, each signal generator 620-1 through 620-N generates a square wave having a frequency which is unique to that signal generator. With signal generators 620-1 through 620-N configured in this manner, each adaptive processor is independent of the other adaptive processors. In other words, each adaptive processor minimizes the magnitude of the correlation at input terminals 601 and 602 with respect to its respective control signal.

DC block 611 (optional) can be added to controller 600 to remove the DC component in the output of correlation magnitude circuit 610, thereby minimizing the AC fluctuations which must be filtered by low pass filters 623-1 through 623-N.

In contrast to the limitations of controller 500, controller 600 does not require the correlation measurement from correlator 131 to be phase matched to the canceler circuit 110. This occurs because controller 600 uses only the magnitude of the measured correlation as feedback information, and discards phase information from the measured correlation. Also, because adaptive processors 612-1 through 612-N are independent from each other by virtue of the mutual orthogonality of the signals from signal generators 620-1 through 620-N, controller 600 is configured to control canceler circuit 110 in N, rather than two, degrees of freedom.

Figure 7:
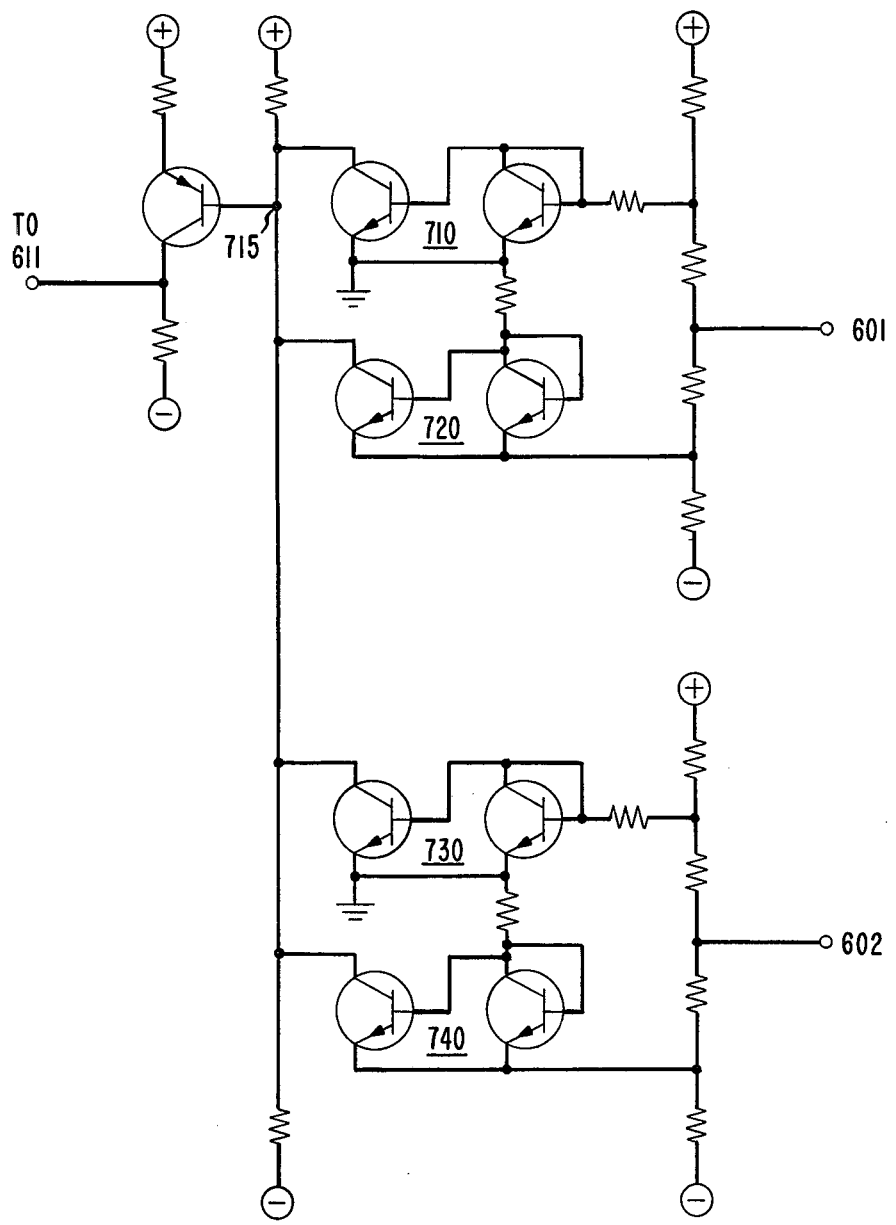
FIG. 7 is a circuit diagram of a correlation magnitude circuit as shown in FIG. 6.

An embodiment of correlation magnitude circuit 610 is shown in FIG. 7. If the input signal at terminal 601 is positive, current mirror 710 conducts, drawing current from summing junction 715. This causes current mirror 720 to be reverse biased and, therefore, non-conducting. Similarly, if the input signal at terminal 601 is negative, current mirror 720 conducts, drawing current from summing junction 715. This, in turn, causes current mirror 710 to be reverse biased. Current mirrors 730 and 740 perform analogously to the current mirrors previously described with respect to the input signal at terminal 602. When current is drawn from summing junction 715 by conducting current mirrors, the voltage at junction 715 will drop. This voltage change is inverted by transistor 750 along with a DC level shift to produce a correlation magnitude output signal at terminal 611.

What is claimed is:

1. An adaptive interference cancellation arrangement of the type including
   cancellation means responsive to at least one first control signal for translating a first corrupted signal into a first output signal substantially comprised of a desired signal component of the first corrupted signal, the cancellation means also responsive to at least one second control signal for translating a second corrupted signal into a second output signal substantially comprised of a desired signal component of the second corrupted signal,
   correlation means jointly responsive to the first and second output signals for combining the first and second output signals to generate both a first correlation signal and a second correlation signal, and
   control means for adjusting at least one predetermined characterstic of first correlation signal to generate at least one first control signal and for adjusting at least one predetermined characteristic of the second correlation signal to generate at least one second control signal,
   the arrangement characterized in that the combining means includes
   oscillator means for generating first and second clock signals in an orthogonal relationship with each other,
   switching means for periodically adjusting the phase of the first output signal in response to the first and second clock signals to generate a plurality of phase adjusted components of the first signal as a first multiplexed signal,
   means for combining the second output signal with the first multiplexed signal to generate a third output signal,
   a square law device for detecting the power in the third output signal to generate an output signal representing the power envelope of the third output signal, and
   a quadrature detector coupled to the square law device and responsive to the first and second clock signals for generating the second correlation signal.

2. The arrangement as defined in claim 1 wherein the switching means includes a discriminator for enhancing a desired portion of the first output signal, and
   quadrature switching means connected in circuit with the discriminator and controlled by the first and second clock signals for sampling an output signal from the discriminator to generate the first multiplexed signal.

3. The arrangement as defined in claim 1 wherein the switching means, the combining means, the square law device and the quadrature detector are included in a first circuit path, and wherein a second circuit path includes
   switching means for periodically adjusting the phase of the second output signal in response to the first and second clock signals to generate a plurality of phase adjusted components of the second signal as a second multiplexed signal,
   means for combining the first output signal with the second multiplexed signal to generate a fourth output signal,
   a square law device for detecting the power in the fourth output signal to generate an output signal representing the power envelope of the fourth output signal, and
   a quadrature detector coupled to the square law device and responsive to the first and second clock signals for generating the first correlation signal.

4. The arrangement as defined in claim 3 wherein the switching means of the first circuit path includes a discriminator for enhancing a desired portion of the first output signal, and quadrature switching means connected in circuit with the discriminator of the first circuit path and controlled by the first and second clock signals for sampling an output signal from the discriminator to generate the first multiplexed signal.

5. The arrangement as defined in claim 4 wherein the switching means of the second circuit path includes a discriminator for enhancing a desired portion of the second output signal, and quadrature switching means connected in circuit with the discriminator of the second circuit path and controlled by the first and second clock signals for sampling an output signal from the discriminator to generate the second multiplexed signal.

6. An adaptive interference cancellation arrangement of the type including cancellation means responsive to at least one first control signal for translating a first corrupted signal into a first output signal substantially comprised of a desired signal component of the first corrupted signal, the cancellation means also responsive to at least one second control signal for translating a second corrupted signal into a second output signal substantially comprised of a desired signal component of the second corrupted signal, correlation means jointly responsive to the first and second output signals for combining the first and second output signals to generate both a first correlation signal and a second correlation signal, and control means for adjusting at least one predetermined characteristic of the first correlation signal to generate at least one first control signal and for adjusting at least one predetermined characteristic of the second correlation signal to generate at least one second control signal, the arrangement characterized in that the combining means includes oscillator means for generating first and second clock signals in an orthogonal relationship with each other, switching means for periodically adjusting the phase of the first output signal in response to the first and second clock signals to generate a plurality of phase adjusted components of the first signal as a first multiplexed signal, means for combining the second output signal with the first multiplexed signal to generate a third output signal, a first discriminator for enhancing a first component of the third signal, a first square law device for detecting the power in an output signal of the first discriminator to generate a signal representing the power envelope of the first discriminator output signal, a first quadrature detector coupled to the first square law device and responsive to the first and second clock signals for generating the second correlation signal, a second discriminator for enhancing a second component of the third signal, means for combining the second output signal with the first multiplexed signal to generate a third output signal, a second square law device for detecting the power in an output signal of the second discriminator to generate an output signal representing the power envelope of the second discriminator output signal, and a second quadrature detector coupled to the second square law device and responsive to the first and second clock signals for generating the first correlation signal.

7. An adaptive interference cancellation arrangement of the type including cancellation means responsive to at least one first control signal for translating a first corrupted signal into a first output signal substantially comprised of a desired signal component of the first corrupted signal, the cancellation means also responsive to at least one second control signal for translating a second corrupted signal into a second output signal substantially comprised of a desired signal component of the second corrupted signal, correlation means jointly responsive to the first and second output signals for combining the first and second output signals to generate both a first correlation signal and a second correlation signal, and control means for adjusting at least one predetermined characteristic of the first correlation signal to generate at least one first control signal and for adjusting at least one predetermined characteristic of the second correlation signal to generate at least one second control signal, the arrangement characterized in that the combining means includes oscillator means for generating first and second clock signals in an orthogonal relationship with each other, switching means for periodically adjusting the phase of the first output signal in response to the first and second clock signals to generate a plurality of phase adjusted components of the first signal as a first multiplexed signal, means for combining the second output signal with the first multiplexed signal to generate a third output signal, a first square law device for detecting the power in the third output signal to generate an output signal representing the power envelope of the third output signal, a first quadrature detector coupled to the first square law device and responsive to the first and second clock signals for generating the second correlation signal, a first discriminator for enhancing a first component of the first output signal to generate a fourth output signal, a second square law device for detecting the power in the fourth output signal to generate an output signal representing the power envelope of the fourth output signal, and a second quadrature detector coupled to the second square law device and responsive to the first and second clock signals for generating the first correlation signal.

8. The arrangement as defined in claim 7 wherein the switching means includes a second discriminator for enhancing a second component of the first output signal, and quadrature switching means connected in circuit with the second discriminator and controlled by the first and second clock signals for sampling an output signal from the second discriminator to generate the first multiplexed signal.

* * * * *